US010974396B2

(12) United States Patent
Bartlett et al.

(10) Patent No.: US 10,974,396 B2
(45) Date of Patent: Apr. 13, 2021

(54) ROBOTIC SYSTEM FOR SURFACE TREATMENT OF VEHICLES

(71) Applicant: Southwest Research Institute, San Antonio, TX (US)

(72) Inventors: Glynn R. Bartlett, Boerne, TX (US); Jeremy K. Zoss, San Antonio, TX (US); William C. Flannigan, San Antonio, TX (US); Peter Boeijink, Schiphol-Rijk (NL)

(73) Assignee: Southwest Research Institute, San Antonio, TX (US)

( * ) Notice: Subject to any disclaimer, the term of this patent is extended or adjusted under 35 U.S.C. 154(b) by 326 days.

(21) Appl. No.: 16/015,236

(22) Filed: Jun. 22, 2018

(65) Prior Publication Data
US 2019/0389078 A1    Dec. 26, 2019

(51) Int. Cl.
*B25J 11/00* (2006.01)
*B64F 5/27* (2017.01)
*B64F 5/40* (2017.01)
*B25J 13/08* (2006.01)

(52) U.S. Cl.
CPC ............ *B25J 13/089* (2013.01); *B25J 11/005* (2013.01); *B25J 11/0075* (2013.01)

(58) Field of Classification Search
CPC ........ B25J 5/007; B25J 13/089; B25J 11/005; B25J 11/0075; B64F 5/40; B64F 5/27
See application file for complete search history.

(56) References Cited

U.S. PATENT DOCUMENTS

| | | | |
|---|---|---|---|
| 3,255,893 A | 6/1966 | Hainer et al. | |
| 3,359,687 A | 12/1967 | Wallace | |
| 3,876,255 A | 4/1975 | Ilon | |
| 4,060,315 A | 11/1977 | Heinz | |
| 4,659,902 A | 4/1987 | Swensrud et al. | |
| 4,900,891 A * | 2/1990 | Vega | B08B 7/0042 219/121.6 |
| 5,134,266 A * | 7/1992 | Peppard | H05B 6/80 126/271.1 |
| 5,387,969 A | 2/1995 | Marantette | |
| 5,409,537 A * | 4/1995 | Poullos | C09D 5/1668 118/641 |
| 5,823,474 A * | 10/1998 | Nunnally | B64F 5/27 244/134 E |
| 5,986,234 A * | 11/1999 | Matthews | B08B 7/0042 219/121.68 |
| 9,221,506 B1 | 12/2015 | Georgeson et al. | |

(Continued)

FOREIGN PATENT DOCUMENTS

EP     224451 B1    6/1989
EP   2 631 041 A2   8/2013
(Continued)

*Primary Examiner* — Stephen Holwerda
(74) *Attorney, Agent, or Firm* — N.V. Nederlandsch Octrooibureau; Catherine A. Shultz; Katelyn J. Bernier

(57) ABSTRACT

A robotic surface treatment system includes an omnidirectional base vehicle; a mast extending from the base vehicle; an arm extending from the mast and moveable in relation to the mast; a wrist connected to a distal end of the arm; and a surface treatment system extending from the base to the wrist through an inside of the mast, arm and wrist.

19 Claims, 8 Drawing Sheets

(56) References Cited

U.S. PATENT DOCUMENTS

| | | | | |
|---|---|---|---|---|
| 2011/0174563 A1* | 7/2011 | Riesner | .................... | B25J 5/007 |
| | | | | 180/117 |
| 2012/0163539 A1* | 6/2012 | van der Veen | ....... | A61N 5/1071 |
| | | | | 378/65 |
| 2016/0130017 A1* | 5/2016 | Best | ................. | G05B 19/41895 |
| | | | | 427/427.1 |
| 2016/0207077 A1* | 7/2016 | Farmer | .................... | G21F 9/005 |

FOREIGN PATENT DOCUMENTS

| WO | 93/00261 A1 | 1/1993 |
|---|---|---|
| WO | 96/36461 A1 | 11/1996 |
| WO | 2016068174 A1 | 5/2016 |

\* cited by examiner

ROBOTIC SYSTEM FOR SURFACE TREATMENT OF VEHICLES

BACKGROUND

Surface treatment of aircrafts is an important task not only during manufacture but also for the maintenance of aircrafts. Various surface treatments can include depainting/stripping of organic/inorganic materials layered on a base material or substrate, inspection of the materials and substrates to be able to conclude on the actual specifications of the materials or substrate, repairing and/or correcting the materials or substrate to specifications, and painting, printing or adhesive covering the materials or substrate in one or more layers to conform to certain specifications. Outer paint of an aircraft must be in sufficiently good condition for the aircraft to be able to perform optimally and safely during operations. Small scratches or lifted parts of paint can affect the aircraft performance. It this thus required to remove outer paint completely and to apply new paint regularly. However, the paint used on the outer surface of aircrafts, due to the conditions it has to withstand, is not easily removable. Such paint is typically removed by manually applying a chemical solution which is able to dissolve the paint. The complicated architecture of plane bodies also makes manual application the safest option to ensure that the aircraft is not damaged during the process of removal or repainting.

SUMMARY

According to a first aspect of the invention, a robotic surface treatment system comprises an omnidirectional base vehicle; a mast extending from the base vehicle; an arm extending from the mast and moveable in relation to the mast; a wrist connected to a distal end of the arm; and a surface treatment system extending from the base to the wrist through an inside of the mast, arm and wrist.

Such a system can allow for providing surface treatments on large and/or complicated structures which had to be done manually in the past. Using a mast, arm, wrist and omnidirectional base vehicle allows for transporting and keeping various elements related to the surface treatment(s) at least partially inside the system to deliver to various surfaces for treatment.

According to an embodiment, the robotic surface treatment system is for surface treating with a laser beam, and the surface treatment system comprises a laser channel extending through the interiors of the mast, the arm and the wrist; and a plurality of deflection systems to align the laser beam for transport through all parts of the laser channel. Such a system can accurately and safely transport the laser from the base vehicle to the wrist for surface treatment.

According to an embodiment, each of the plurality of deflection systems comprise a mirror which is able to be moved and/or tilted. The mirror can help to direct the laser, and the ability to move or tilt the mirror can ensure accurate laser positioning despite the many bends or turns as well as the relative movements between robotic system components.

According to an embodiment, the system further comprises a control system to align the laser beam with each of the plurality of deflection systems and the laser channels. Optionally, the control system comprises a camera associated with each of the plurality of deflection systems, the camera configured to detect the positioning of the laser beam on the deflection system and send a signal related to the positioning of the laser beam on the deflection system; and a controller to receive the signal and adjust the path of the laser beam according to a desired position on the deflection system. Further optionally, the controller adjusts the path of the laser beam according to a desired position by adjusting another of the plurality of deflection system to deflect the laser beam according to the desired position. Such a system can accurately align throughout operations to ensure the laser beam is properly positioned for safe and accurate surface treatments despite system movements. The system can also be used for a pre-alignment check to ensure deflection systems are properly aligned before switching on the laser.

According to an embodiment, the system further comprises an exhaust channel extending through the interior of the mast, the arm and the wrist. Optionally, the exhaust channel comprises a plurality of vanes. Further optionally, the exhaust channel at least partially surrounds the laser channel through at least part of the mast, the arm and the wrist. An exhaust channel can allow for the suctioning and transport of all effluent generated back to the base vehicle for neutralization and/or disposal. Vanes can help with guiding the exhaust gases between various system parts, particularly when there are sharp turns, e.g., between the mast and the arm. The exhaust channel at least partially surrounding the laser channel can help to ensure all gases are suctioned, and to help cool the area surrounding the laser.

According to an embodiment, the arm is able to rotate, move translationally, and move up or down with respect to the mast. This can allow for reaching difficult surfaces, for example, all the various surfaces of an aircraft.

According to an embodiment, the mast and/or the arm are extendable. This can be through extension movement systems, telescopic systems, etc. Being able to extend the mast and/or the arm can help the system reach further surfaces without having to move and realign. This can save time for overall operations.

According to an embodiment, the wrist allows for at least three degrees of movement. In some systems the wrist can have four or more degrees of movement. Such a wrist allows for precise positioning of an outlet for surface treatment.

According to an embodiment, the omnidirectional base vehicle comprises a bogie with a plurality of mecanum wheels and/or one or more tracks; and a flexible suspension system connecting the bogie to the base vehicle. The bogie with Mecanum wheels and/or track(s) allows for movement in any direction. The flexible suspension system connecting the bogie to the base vehicle allows for smooth movements over uneven or rough surfaces. Additionally, the flexible suspension system can provide for easy transitions between moving and parking, as well as ensure that the system is stably and evenly supported in any terrain. Optionally, the omnidirectional base vehicle comprises a plurality of bogies with a plurality of multi-directional wheels and/or tracks; and a flexible suspension system connecting each bogie to the base vehicle. Using multiple bogies can allow for support of large systems.

According to an embodiment, the system further comprises at least one jack to support the system and prevent movement during an operation. Optionally, the at least one jack is connected to the base, and the flexible suspension system lowers the base and jack to support the robotic system in a park mode.

According to a further aspect, the system can be used for printing, painting, fiber laser applications and/or inspection. The interior space of the system can be used for piping, cabling, tubing, fibers or any other components needed for the specific surface treatment.

According to a further aspect, a method of providing a surface treatment on a large vehicle comprises moving a robotic surface treatment system to a desired location by moving an omnidirectional base vehicle which supports the system; placing the robotic surface treatment system in a park mode; moving a moveable arm and/or wrist to direct an output point of the wrist toward a surface of the large vehicle where the surface treatment is to commence; controllably directing the surface treatment at the surface of the large vehicle, the surface treatment delivered from the base vehicle through a mast, through the arm and wrist through the output.

Such a method can accurately and controllably provide a surface treatment on a large vehicle or other structure that is large and/or has a complicated geometry. The ability to move the base into position and park gives a stable base for operations. Moving the arm and/or writs allows for directing the treatment at a variety of surfaces without the base having to move.

According to an embodiment, the surface treatment is a laser treatment, and the step of controllably directing the surface treatment at the surface of the large vehicle comprises directing the laser from the base through the mast, arm and shoulder using a plurality of deflection systems; and suctioning effluent from the treatment through the wrist, arm and mast to the base. Transporting the laser (or other surface treatment) and effluent through the mast, arm and wrist protects the quality of the surface treatment and components used in the delivery as well as keeps the surface treatment and effluent contained for safety and treatment.

According to an embodiment, the method further comprises checking and adjusting laser alignment before and during operations. This can ensure that the laser is accurately positioned for safe and precise directing through the system.

According to an embodiment, the method and further comprises automatically positioning robotic surface treatment system, and moving arm and/or wrist based on a detected positioning and orientation of the vehicle. Such a system allows for surface treatments of large or complicated structures while ensuring the system does not contact or damage the structure, particularly important when treating sensitive surfaces such as aircraft.

BRIEF DESCRIPTION OF THE DRAWINGS

FIGS. 2b-2e shows close up portions of FIG. 2a.

FIG. 4b shows a cross-sectional view of the arm of FIG. 4a.

FIG. 5b shows a cross-sectional view of the mast of FIG. 5a.

DETAILED DESCRIPTION

Figure 1A:
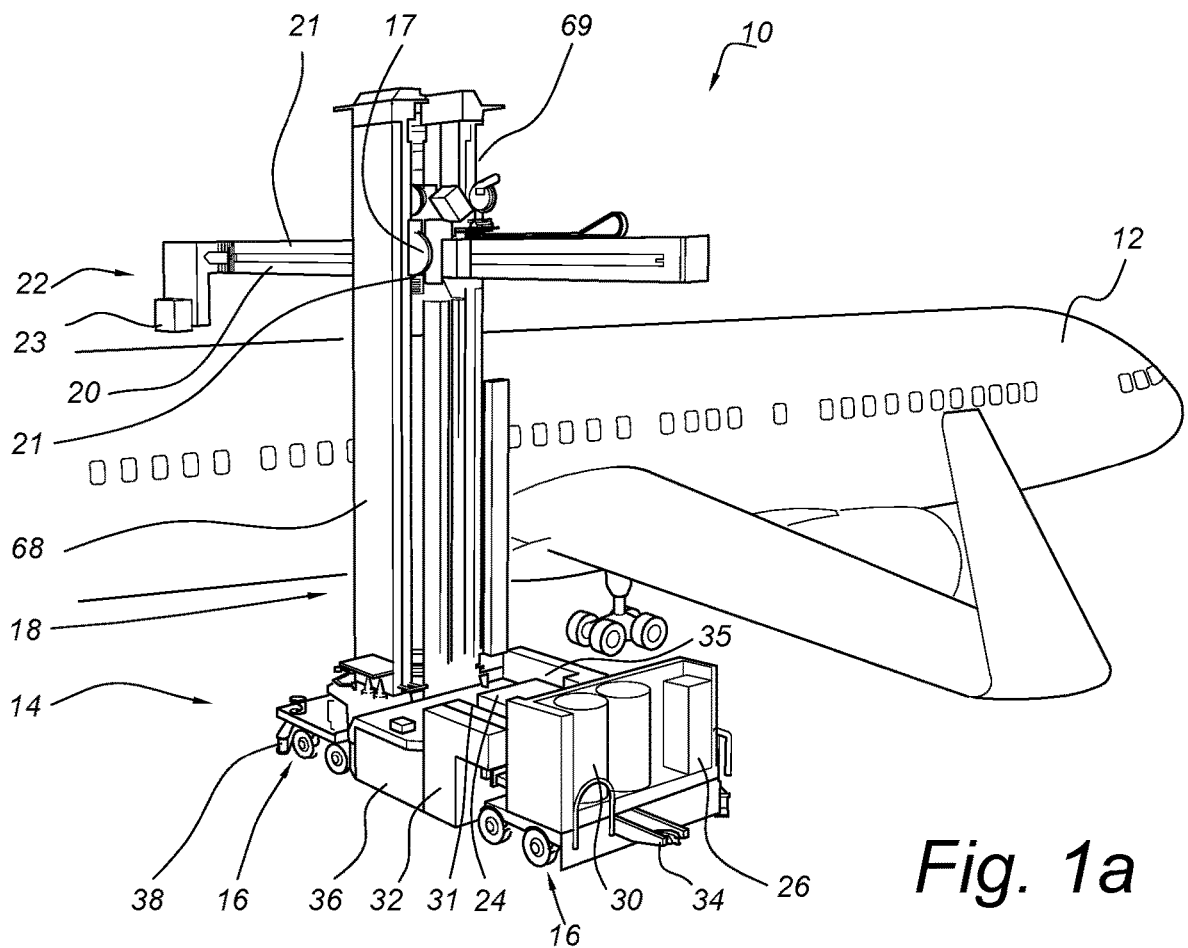
FIG. 1a illustrates a perspective view of a robotic system used for surface treatment of vehicles.
Figure 1B:
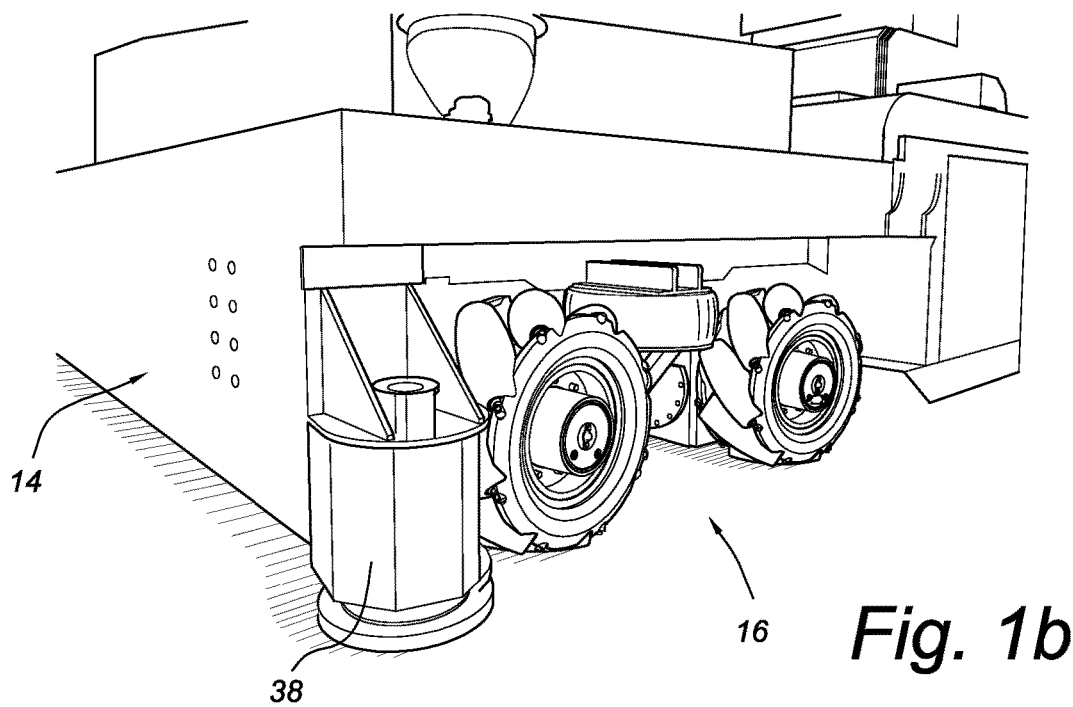
FIG. 1b shows a perspective view of a part of robotic system base and a bogie in a drive mode.
Figure 1C:
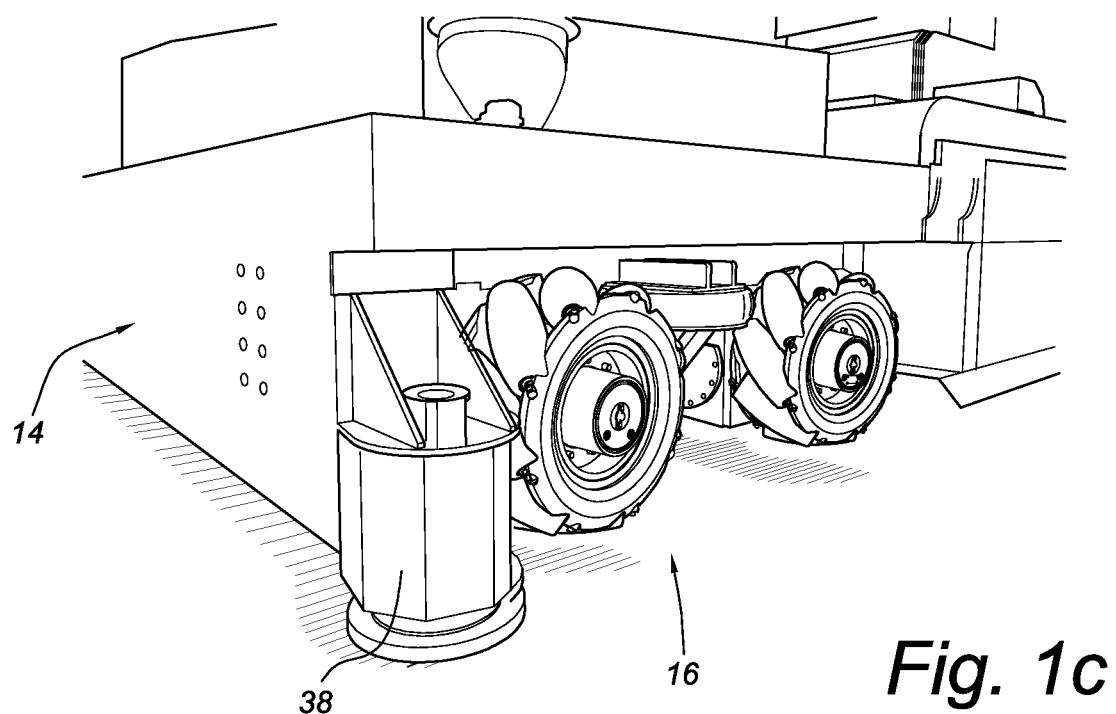
FIG. 1c shows a perspective view of FIG. 1b, with the base lowered for operations in a park mode.

FIG. 1 illustrates a perspective view of a robotic system 10 used for surface treatment of vehicles. While system 10 is shown and described as a paint removal system using a high-power laser to ablate coatings by scanning a laser across a surface of aircraft 12, it should be understood that system 10 could be used to provide many different surface treatments, such as painting, sanding, direct printing, applying or removing other coatings or surface treatments, washing, wipe-down, surface scanning or inspection and repairs. Additionally, system 10 could be used with other vehicles or structures, such as helicopters, ships, trucks, cars, underwater vehicles, space craft; or any vehicles or structures that involve large areas and/or complicated positioning to reach all surfaces.

System 10 is a self-contained surface treatment system with mobile base 14 connected to omnidirectional bogies 16. Base uses four bogies 16, which can be moved in any direction through the use of two sets of Mecanum wheels associated with each bogie 16 and a flexible suspension system to allow for smooth driving and stable parking for operations. Details of bogies can be found in U.S. application Ser. No. 16/015,243, titled Omnidirectional movement system, filed on Jun. 22, 2018, the contents of which are hereby incorporated by reference. While mobile base 14 is shown with Mecanum wheels, some mobile bases could instead use one or more tracks for movement and support.

Any needed utilities, such as electrical power, cooling water and gas may be provided via a tether which can connect to umbilical coupling 34 on base 14. In some cases, only some utilities or even none of these would be needed (e.g., power is provided by batteries on base), making system 10 flexible for operations at a variety of locations, and easily maneuverable without a lot of cords or connections.

Mobile base 14 is able to accommodate various aircraft and hangar variations by being relatively compact yet stable such that it can drive up to aircraft 12, "park" itself and provide a stable base for operations. Omnidirectional bogies 16 and a flexible suspension system result in mobile base 14 being able to evenly distribute the large load of system 10 while also being able to smoothly navigate areas that are not level or have obstacles. The flexible suspension system of bogies 16 allow for base 14 to be in a drive mode (see FIG. 1b) where base and jacks 38 are raised above ground level (with sufficient clearance for obstacles), and then to allow jacks 38 (and possibly overall base 14) to be lowered such that system 10 weight rests on jacks 38 for park mode (see FIG. 1c) and wheels on bogies 16 carry little to none of the system 10 weight during operations. This ensures a stable base such that the movements of arm 20 and wrist 22 are supported during operations to minimize the risk of damage to treatment surfaces.

System 10 also includes a number of other components on base 14 related to the particular surface treatment, in this system, laser generator 24, laser power unit 26, control system cabinet 31, gas holders 30, filtration unit 32, umbilical coupling 34, heat exchanger 35, scanner 36, hydraulic system 37 and jacks 38. Other systems could include other components supported by base in addition to or in lieu of the components shown on base 14. These could include, for example, exhaust filters, batteries, paint and/or paint lines, etc.

Surface treatments are delivered from base 14 through mast 18, shoulder 19, arm 20 and wrist 22, which in this case together provide the structure to enable the laser beam to transport from base 14 to any desired point on the aircraft 12 surface. Mast 18 and arm 20 are extendable and are able to rotate (e.g., through linear gears 21 and rotary gears 17), though the rotation of mast 18 may be through base 14 movement or rotation. Shoulder 19 allows for the rotation and translation of arm 20 with respect to mast 18. In some embodiments, arm 20 could be a telescoping arm instead of a translating arm. Arm 20 is also able to move up and down through the length of mast 18 through linear gears 21. Wrist 22 provides more axes of flexibility, for example 3, to provide system 10 the ability to reach and treat all surfaces of aircraft 12. Movement systems shown can vary depending on mast 18, shoulder 19, arm 20 and wrist 22 configuration, the treatment surface and/or other requirements.

The laser is transported from base 14 to wrist 22 through hollow portions of mast 18, arm 20 and wrist 22 and is guided by a series of mirrors with a mirror control and alignment system to ensure accurate laser beam positioning, as detailed in relation to FIGS. 2a-3b. System 10 also includes an exhaust gas system for removing the effluent through the interior of mast 18, arm 20 and wrist 22; and a system for positioning and orientation of all system 10 components with respect to aircraft 12.

Control of robotic system 10 can be either automatic or manual. Typically, at the start of an operation, the type of aircraft 12 (or other structure) is selected. A positioning system, detailed in U.S. application Ser. No. 16/015,240, titled Localization System and methods, filed Jun. 21, 2018, the contents of which are herein incorporated by reference, is used to determine the position and orientation of the aircraft 12. This typically involves hanging a number of targets at known positions on the aircraft, and using scanner(s) 36 to map the target positioning with the known aircraft dimensions and configuration such that robotic system is able to accurately position output 23 of wrist 22 to direct the laser at any surface of the aircraft 12 without contacting that surface. This is important due to the large sizes and complicated geometries of aircraft 12, and the susceptibility of damage to aircraft 12 surface from any contact.

Once positioning is known, robotic system can be moved to a desired starting location. Bogies 16 can drive base to a first position (e.g., near a front portion of the aircraft 12 and at a position that output 23 is able to reach the very front knowing the lengths which arm 20 and wrist 22 can extend). Base 14 can then be put in a park mode (see FIG. 1c), where bogies 16 flexible suspension system lowers base 14 and jacks 38 such that base 14 is at least primarily supported by jacks 38 (instead of wheels). Operations can then begin. Arm 20 and wrist 22 are positioned at a starting position. Laser alignment is checked, and then high-powered laser beam may be turned on. Robotic system arm 20 and wrist 22 movement can follow a pre-programmed path to ensure all surfaces are sufficiently treated, and more than one pass may be used if needed. Laser can also be adjusted such that only certain layers are removed. Optical sensors (or other sensor means) can be used to ensure that the laser avoids obstacles (e.g., windows).

The laser can sweep very quickly, for example 200 times per second, to ensure efficient surface treatment despite the large and complicated surface area of aircraft 12. In addition, a camera or other sensor can be used to ensure that the laser is effectively removing the desired layers. This can be done, for example, through using a photo taken one or more times per sweep for color and appearance analysis. The laser power, and robotic movement and speed can be updated continuously based on this sensing and analysis.

During laser operations, effluent removal system also works to remove the gases generated. Effluent removal channels (see. FIGS. 3b, 4b) have negative pressure generated from base 14 (e.g., through a filtration system on base 14) such that effluent gets suctioned through wrist, arm and mast to base 14 where it can be cleaned (e.g., through filters in filtration unit 32) and properly disposed of (e.g., clean gas is released after the cleaning in filters). The suction provided must be at a level that exhaust gas and micropollution at the point of laser removal is taken into effluent removal channels with the exhaust gas. Output 23 can have a specific configuration, such as an effluent channel input fully surrounding the laser channel output to promote the full suctioning of all exhaust gases. Such a configuration could then transition into the channels shown in FIG. 4a of arm (which are also typically the channels which form wrist 22). Filtration unit 32 can also provide additional air or other cases for cooling of effluent. Effluent channels can include vanes at various positions to help gases move in the correct direction, particularly when moving around a tight corner, such as the travel from arm 20 to vertical mast 18.

When robotic system 10 has removed all coatings within the reach of arm 20 and wrist 22, system 10 may be moved to a second position in relation to aircraft 12 such that it can reach untreated surfaces. The same procedure is used for moving, parking and then operations. When the full surface of the aircraft has been treated, robotic system 10 can move to a different location for storage or to begin new operations.

As mentioned in the background, past surface treatment systems for paint removal on an aircraft typically involved manual application of solvent. Robotic system 10 provides an efficient method for surface treatment that is able to treat the complicated surface geometry of aircrafts while minimizing the risks of damage to the aircraft and the manual labor needed. The use of a high-powered laser can efficiently and effectively remove coatings, and the movements systems of base 14, mast 18, shoulder 19, arm 20 and wrist 22 enable the laser to reach the desired positions without the need for manual intervention. The laser alignment system ensures that the laser stays properly aligned through the use of moveable mirrors despite all movements and turns to reach different surfaces, ensuring a safe system even when using high powered laser beams. The mobile base 14 allows for easy and flexible movement to desired positions to accommodate many different aircraft and hangar (or other treatment location) variations.

Figure 2A:
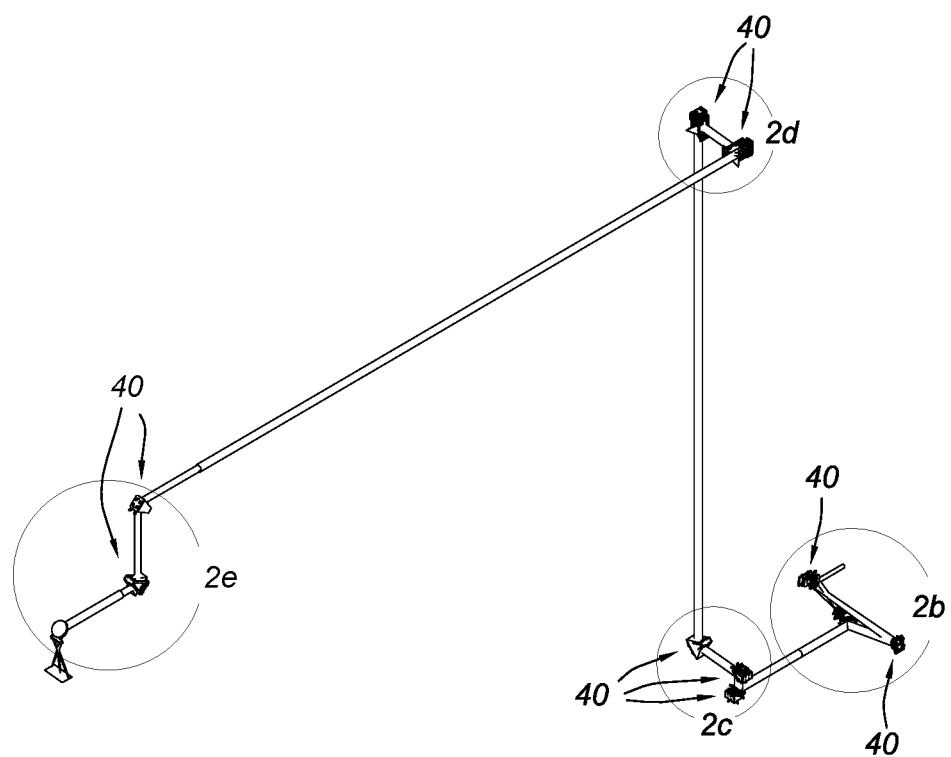
FIG. 2a shows a view of a laser path through the robotic system of FIG. 1.
Figure 2B:
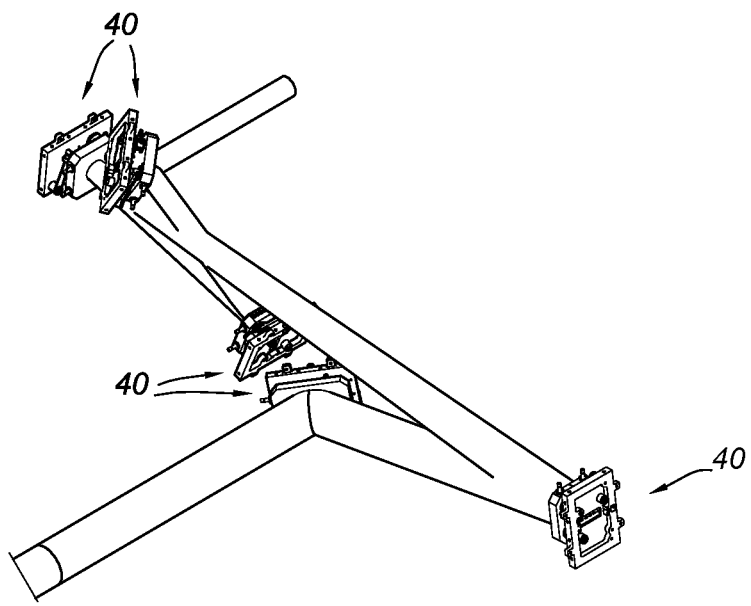
Figure 2C:
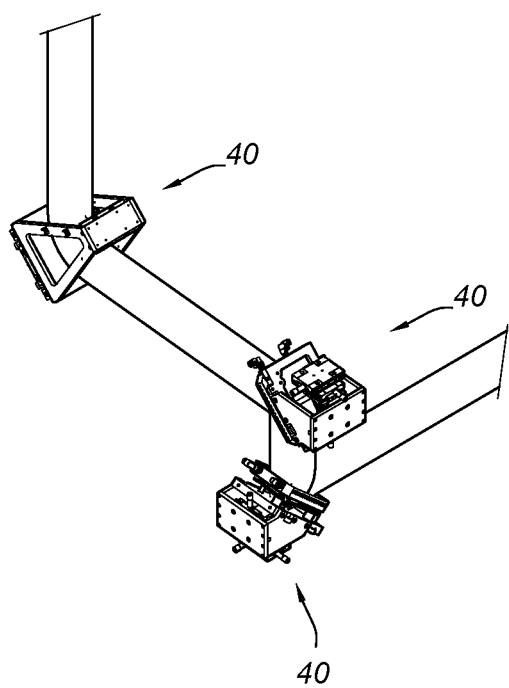
Figure 2D:
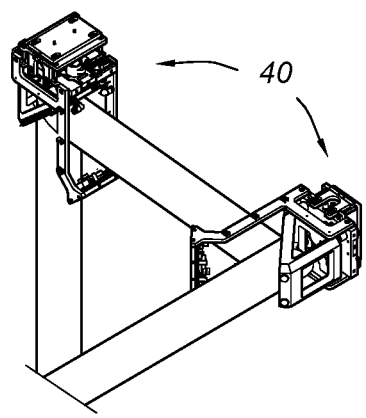
Figure 2E:
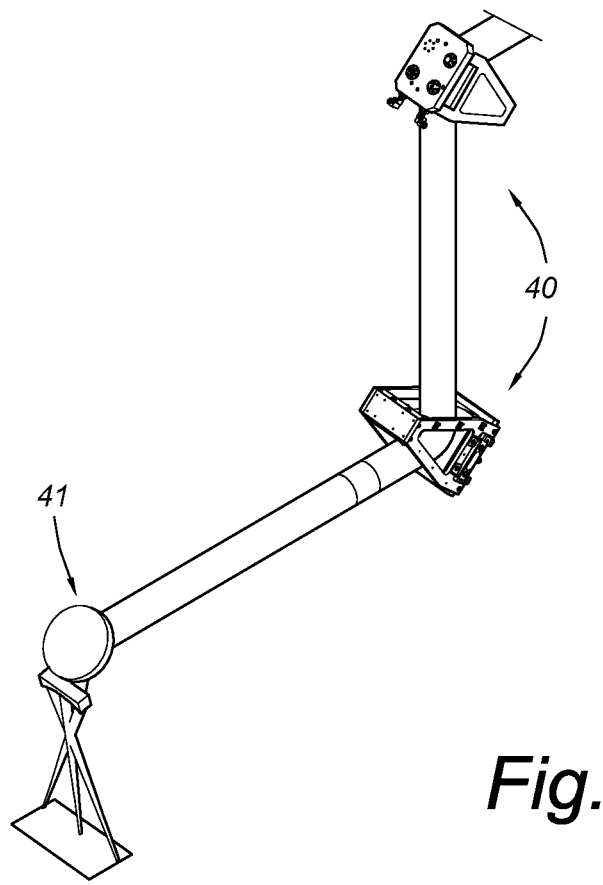

FIG. 2a shows a view of a laser path through robotic system 10, FIGS. 2b-2e shows close up portions of the laser path.

Laser path is guided by deflection systems 40 located at every point the laser needs deflection to follow the path desired from the laser source to the desired surface treatment point on the aircraft 12. In system 10, laser beam is deflected by eight deflection systems 40 (shown in FIGS. 2b-2c) on base 14 to enter mast 18 at the desired location (in a center of a laser channel). The laser is deflected vertically up mast to shoulder 19, where it is then deflected horizontally to enter arm 20 and then deflected to extend toward wrist 22 (shown in FIG. 2d). At wrist 22, laser is deflected by two different deflection systems and then is reflected toward the surface of the aircraft 12 (or other desired surface) by one or more mirrors 41 at an output 23 of wrist 22.

Figure 3A:
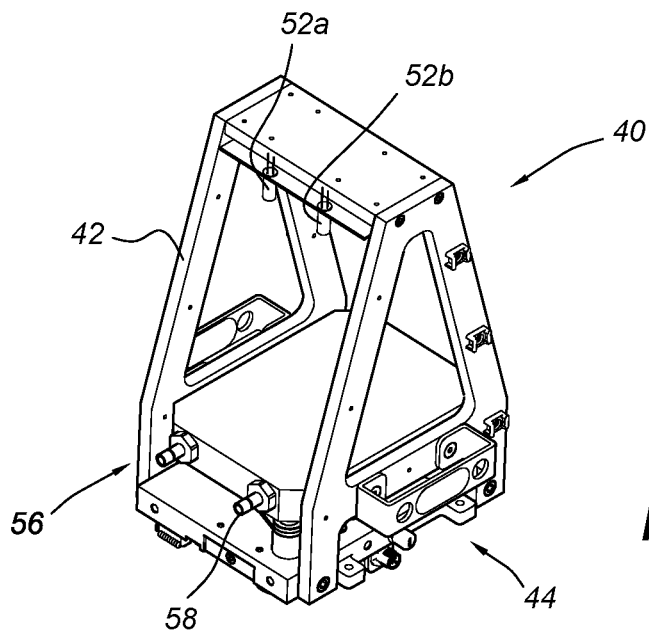
FIG. 3a shows a perspective view of a deflection system from a top side.
Figure 3B:
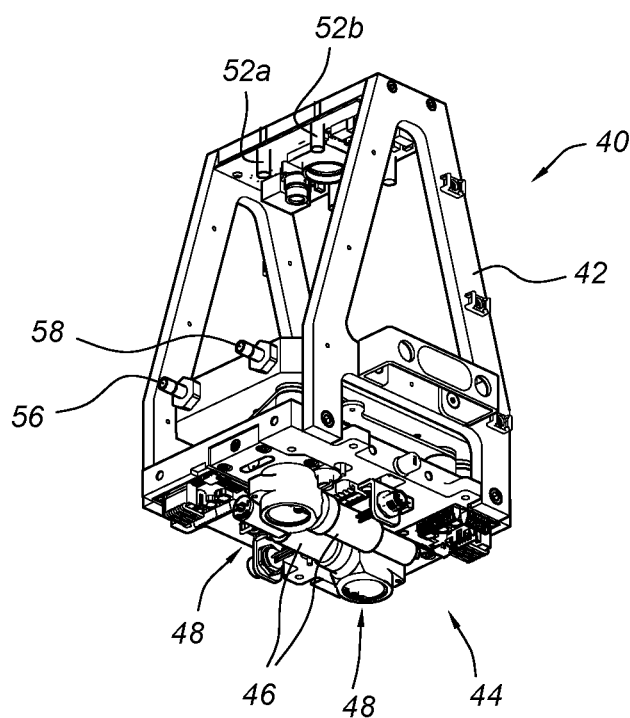
FIG. 3b shows a perspective view of the deflection system of FIG. 3a from an under side.

FIG. 3a shows a perspective view of a deflection system 40 from a top side, and FIG. 3b shows a perspective view of deflection system 40 from an under side. Deflection system 40 includes frame 42, movement system 44 (with motors 46 and drive train 48), mirror 50 and cameras 52. Mirror 50 includes dimples 54, inlet 56 and outlet 58.

Mirror 50 surface is typically aluminium or copper though other suitable materials may be used. Inlet 56 and outlet 58 are for the circulation of a cooling agent (e.g., water or gas) to ensure mirror 50 is not overheated during operation when deflecting the laser beam. Dimples 54 can be in any set pattern, and work to deflect a small portion of the laser beam such that cameras 52a, 52b are able to detect the laser beam hitting the mirror surface and the location of the beam on the mirror 50 surface. Mirror 50 can also include a safety system which can, for example, sends a signal for an automatic shutoff of the laser if it is detected that the laser beam gets close to an edge of the mirror 50. This can include, for example, one or more safety sensors monitoring a heat load on edges or corners of the mirror 50.

Mirror 50 is connected to frame 42 through movement system 44, which is able to move or tilt mirror 50 with respect to frame 42. This movement can be in one or more directions through one or more motors 46, drive trains 48 and other components (e.g., connectors, brackets, gears) which connect between frame 42 and mirror 50 to controllably move or tilt mirror 50. Mirror 50 is able to be tilted in two directions using two motors 46 and two drive trains 48, though other deflection systems 40 could include more or fewer movement or tilt options. This movement is controlled by the alignment system detailed in U.S. application Ser. No. 16/015,237, titled Laser beam positioning method using a patterned mirror, filed on Jun. 22, 2018, the contents of which are hereby incorporated by reference. Depending on where deflection system 40 is located within the laser path shown in FIG. 2a, movements and control can vary. For example, a first deflection system 40 located directly after the laser source may typically involve very minimal movements, though a deflection system 40 located in the wrist 22 may be able to move or tilt in a larger range (or ranges) to accommodate all the different motions in that location.

Cameras 52a, 52b are typically infrared cameras or other types of detectors that are able to detect the laser on mirror 50 and the position of laser on mirror 50. Cameras 52a, 52b are connected to frame 42 at an upper portion, allowing sufficient distance for proper detection on mirror 50 and providing a stable holding position with respect to mirror 50. One camera 52a could be used for detecting a low-powered beam which is solely used for alignment, and one camera 52b could be used for detection of the main or high-powered laser beam. Other embodiments could have more or fewer cameras, for example, additional cameras for solely beam detection (e.g., for safety to ensure the beam has not been interrupted or otherwise compromised) while the first camera(s) are used for dimple detection. Extra cameras can also be used for redundancy and safety reasons—to have a backup camera in case of a main camera malfunctioning. The dimples 54 on mirror 50 are configured and arranged to deflect only a small portion of the beam toward the cameras, e.g., 0.001% of the beam total power. This small deflection can also ensure that the laser energy deflected toward cameras 52a, 52b is not at a level which would damage cameras 52a, 52b. In some embodiments, cameras 52a, 52b may have a shield to further ensure that the laser deflected does not damage the camera and its ability to function. While cameras 52a, 52b are described, another type of detector which can detect the laser beam and position on the mirror could be used, for example, other types of suitable light detectors.

Frame 42 can be connected to various parts within the base 14, mast 18, shoulder 19, arm 20 and wrist 22 depending on the specific configuration of robotic system 10. The connections must be such that the frame is held steady, and configured so that the laser beam enters one side of frame 42, is deflected by mirror 50 and then exits the other side of frame 42, typically toward a subsequent deflection system 40, mirror or treatment surface. Additionally, the number and configurations of deflection systems 40 can vary depending on system 10 size and requirements.

The movement or tilting of mirror 50 with respect to frame 42 ensures that laser beam is deflected to the next desired mirror (or other system or surface) despite any movement of the relative parts (e.g., tilting or translation of arm 20 with respect to mast 20). Because the laser beam used for surface treatments and deflected by mirrors is typically very powerful (e.g., 20 kW), it is important to ensure that the laser beam is properly directed only where desired to avoid damage to components of robotic system 10 or other nearby systems. Frame 42, cameras 52a, 52b, mirror pattern 54, movement system 44 and control and alignment system ensure that the positioning of laser beam on mirror 50 can be detected and the positioning information used to move or tilt previous and/or subsequent mirrors 50 such that the laser beam achieves proper alignment with the one or more mirrors 50 in the system.

Figure 4A:
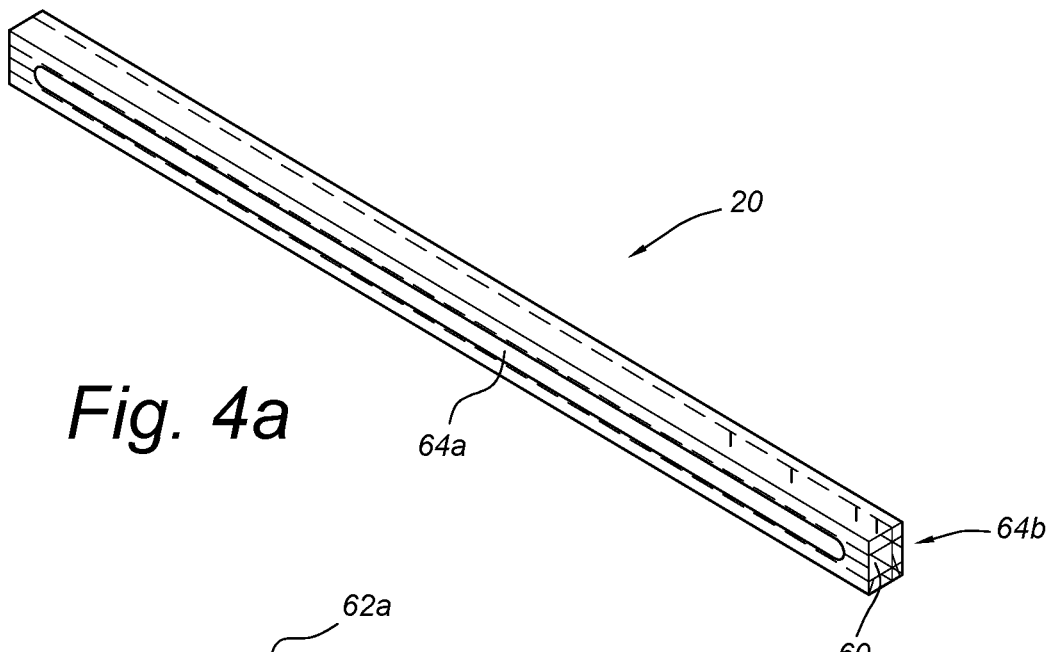
FIG. 4a show a see-through view of an arm of the robotic system of FIG. 1.
Figure 4B:
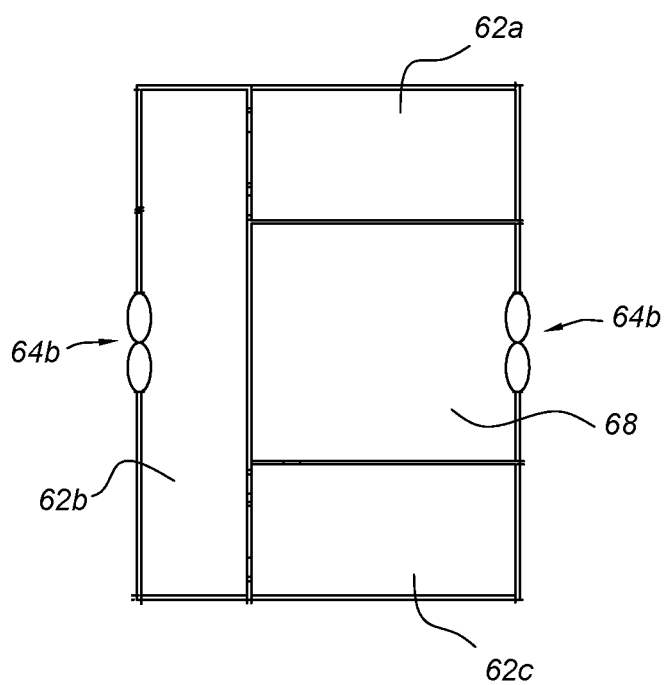

FIG. 4a shows a partially see-through view of arm 20 of the robotic system 10, and FIG. 4b shows a cross-sectional view of arm 20. Arm 20 includes laser channel 60, effluent channels 62a, 62b, 62c; seals 64a, 64b and turning vanes 66. Arm 20 is typically a rigid arm made of a material with sufficient strength and stiffness to extend the length desired (e.g., 15 meters) and controllably support the weight of wrist 22 at one end, for example steel.

Laser channel 60 is located centrally on one side of arm 20, and seal 64a extends at least most of the length of arm 20 and functions as the connection between mast 18 and arm 20 to allow laser beam passage from mast 18 to arm 20. Laser channel 60 must have sufficient cross-sectional area such that the beam passes at a distance from any side, for example, 25 mm, and typically has positive pressure provided from a pressure system on base 14. Seal 64a (and seal 64b) and passage area for laser beam through seals (boat or carriage) are detailed in U.S. application Ser. No. 16/015,242, titled Seal, filed Jun. 22, 2018, the contents of which are herein incorporated by reference. Seals 64a, 64b are typically pressurized seals which allow for arm 20 movements while allowing laser beam passage and preventing dust, moisture or other contaminants from entering laser channel 60.

Effluent channels 62a, 62b, 62c are typically fluidly connected at one or more points through arm 20 to allow for effluent to travel between the channels 62a, 62b, 62c and therefore to exit arm 20 through seal 64b (which is located in channel 62b). Channel 62b has seal 64b extending at least most of the length of arm 20 to connect effluent channels of arm 20 with mast 18 effluent channel (See FIGS. 5a-5b). Seal 64b is typically the same configuration as seal 64a. Effluent channels 62a, 62b, 62c can also include insulation on some or all perimeters to assist in temperature regulation. The temperature of effluent channels 62a, 62b, 62c can be up to 100 deg. C. due to the high temperatures of the effluent gases, but must be reduced to 40 deg. C. at the outer side of arm 20. Insulation, other gas circulation and/or other cooling means can be used to help ensure the proper cooling temperatures are achieved.

The size and shape of laser channel 60 and effluent channels 62a, 62b, 62c are for example purposes only, and could be configured differently in other systems. Channel 60 must be sized to accommodate sufficient clearance around laser beam, and effluent channels 62a, 62b, 62c must be configured such that they can transport the effluent and achieve the required cooling. Arranging effluent channels 62a, 62b, 62c at least partially around laser channel 60 can also assist in cooling laser channel 60. Turning vanes 66 can be inserted at any point which effluent or other gases (e.g., cooling gases) must turn in direction. Here, a number of turning vanes are shown in effluent channels 62a, 62b, 62c; though these could vary in configuration and placement in different systems, for example, be located in wrist 22, mast 18 and/or on base 14.

Figure 5A:
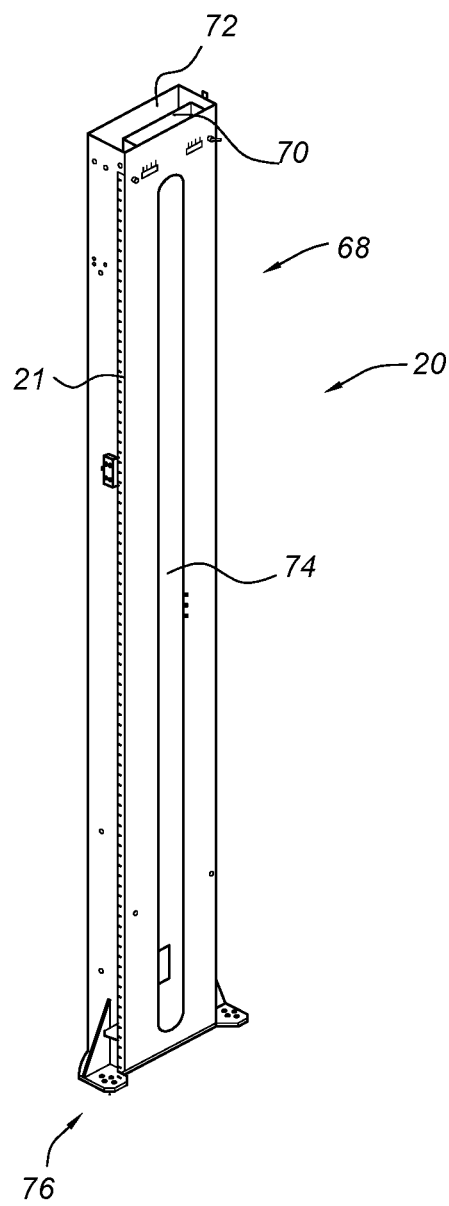
FIG. 5a shows a perspective view of the mast of FIG. 1.
Figure 5B:
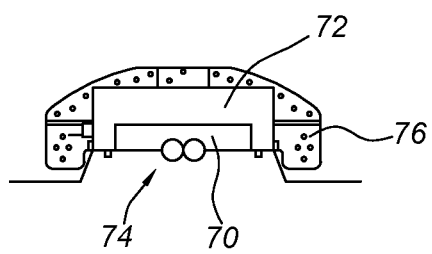

FIG. 5a shows a perspective view of a first side 68 of mast 18, and FIG. 5b shows a cross-sectional view of first side 68. Full mast 20 includes a second side (see FIG. 2, second side 69), which is a mirror version of first side 68 and can be seen in FIG. 1. Arm 20 moves between sides of mast 18 up and down (e.g., through linear gear 21 and/or rotationally through rotational gear 17). First side 68 of mast 18 includes laser channel 70, outer channel 72, seal 74 and base 76. Second side would be configured the same or at least similar, only channel 70 would be for effluent instead of laser 70.

Laser channel 70 is sized sufficiently to allow for laser to travel through a center point and have sufficient clearance from the sides, similar to laser channel 60 described in relation to arm 20. Outer channel 72 can be used for cooling around laser/effluent channel, for example, through the insertion of insulation materials. Outer channel 72 could also be used to house a counterweight which can be connected to arm 20 and assist in minimizing the energy needed to move arm 20 up and down with respect to mast 18.

Base 76 connects to base 14 of robotic system to stably support mast 18 (and therefore arm 20 and wrist 22) on base 14. Mast 18, through first and second sides 68, 69 provides a strong and stable support for arm 20 and wrist 22, and all movements necessary to treat the various surfaces of an aircraft 12 or other large object with complicated surface geometry.

In summary, robotic system 10 provides a compact and efficient means to perform surface treatments on aircrafts or other large object which may have complicated and varying surface geometries. Base 14 supports mast 18, shoulder 19, arm 20 and wrist 22 in a stable manner to allow movement and steady support for operations despite the large size and weight needed for treatment of larger aircraft. Omnidirectional bogies 16 with flexible suspension systems provide for smooth transport of system 10 over ground surfaces and any small obstacles while maintaining a steady base for either driving mode or park mode. The use of a plurality of bogies 16 with flexible suspension systems even allows for parking on slopes or other non-flat surfaces for operations. The movement systems allowing for respective movements of arm 20 and wrist 22 allow for surface treatment of large areas without having to move base 14. The laser alignment system (with the configuration of mast 18, arm 20 and wrist 22 for transport of laser) and robotic system 10 positioning and orientation system ensure robotic system 10 and laser are properly aligned and positioned for operations and avoid contacting undesired areas (which could lead to damage). Additional sensors and other safety systems ensure that laser robotic system 10 performs safely despite the large size, use of high-powered lasers and movements toward and around object surfaces. The ability to accommodate many support systems on base means that robotic system 10 can often be self-supporting, particularly when moving from one location to another, removing the associated cords and complications relating to moving while attached to power sources or other cords. Power sources or other connections may then be connected (if at all) when in park mode, so that robotic system 10 movements are not hindered by the connections.

The size and configuration of robotic system 10 and specific components are for example purposes, and can be varied in different robotic systems. This size, movement systems and relative dimensions could also change depending on the surface treatments and aircraft or other vehicles or systems that robotic system 10 will be treating.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A robotic surface treatment system comprising:
   an omnidirectional base vehicle;
   a mast extending vertically from the base vehicle;
   an arm extending from the mast and moveable in relation to the mast;
   a wrist connected to a distal end of the arm; and
   a surface treatment system extending from the base to the wrist through an inside of the mast, arm and wrist,
   wherein the arm is able to rotate, move translationally, and move up or down with respect to the mast.

2. The system of claim 1, wherein the robotic surface treatment system is for surface treating with a laser beam, and the surface treatment system comprises
   a laser channel extending through the interiors of the mast, the arm and the wrist; and
   a plurality of deflection systems to align the laser beam for transport through all parts of the laser channel.

3. The system of claim 2, wherein each of the plurality of deflection systems comprise a mirror which is able to be moved and/or tilted.

4. The system of claim 2, and further comprising:
   a control system to align the laser beam with each of the plurality of deflection systems and the laser channels.

5. The system of claim 4, wherein the control system comprises:
   a camera associated with each of the plurality of deflection systems, the camera configured to detect the positioning of the laser beam on the deflection system and send a signal related to the positioning of the laser beam on the deflection system; and
   a controller to receive the signal and adjust the path of the laser beam according to a desired position on the deflection system.

6. The system of claim 5, wherein the controller adjusts the path of the laser beam according to a desired position by adjusting another of the plurality of deflection systems to deflect the laser beam according to the desired position.

7. The system of claim 2, and further comprising an exhaust channel extending through the interior of the mast, the arm and the wrist.

8. The system of claim 7, wherein the exhaust channel comprises a plurality of vanes.

9. The system of claim 7, wherein the exhaust channel at least partially surrounds the laser channel through at least part of the mast, the arm and the wrist.

10. The system of claim 1, wherein the mast and/or the arm are extendable.

11. The system of claim 1, wherein the wrist allows for at least three degrees of movement.

12. The system of claim 1, wherein the omnidirectional base vehicle comprises:
- a bogie with a plurality of Mecanum wheels; and
- a flexible suspension system connecting the bogie to the base vehicle.

13. The system of claim 1, wherein the omnidirectional base vehicle comprises:
- a plurality of bogies with a plurality of multi-directional wheels; and
- a flexible suspension system connecting each bogie to the base vehicle.

14. The system of claim 13, and further comprising:
- at least one jack to support the system and prevent movement during an operation.

15. The system of claim 14, wherein the at least one jack is connected to the base, and the flexible suspension system lowers the base and jack to support the robotic system in a park mode.

16. A method of providing a surface treatment on a vehicle, the method comprising:
- moving a robotic surface treatment system with a vertical mast to a desired location by moving an omnidirectional base vehicle which supports the system;
- placing the robotic surface treatment system in a park mode;
- moving a moveable arm and/or wrist to direct an output point of the wrist toward a surface of the vehicle where the surface treatment is to commence, wherein the arm is able to rotate, move translationally, and move up or down with respect to the mast;
- controllably directing the surface treatment at the surface of the vehicle, the surface treatment delivered from the base vehicle through the mast, through the arm and wrist through an output.

17. The method of claim 16, wherein the surface treatment is a laser treatment, and the step of controllably directing the surface treatment at the surface of the large vehicle comprises:
- directing the laser from the base through the mast, arm and shoulder using a plurality of deflection systems; and
- suctioning effluent from the treatment through the wrist, arm and mast to the base.

18. The method of claim 16, and further comprising:
- checking and adjusting laser alignment before and during operations.

19. The method of claim 16, and further comprising automatically positioning robotic surface treatment system, and moving arm and/or wrist based on a detected positioning and orientation of the vehicle.

* * * * *